United States Patent

New

Patent Number: 5,317,226
Date of Patent: May 31, 1994

[54] ROTOR AND STATOR COMPONENTS FOR A MAGNETIC BEARING

[75] Inventor: Nigel H. New, Harrow, United Kingdom

[73] Assignee: The Glacier Metal Company Limited, Middlesex, England

[21] Appl. No.: 960,401

[22] PCT Filed: Jul. 29, 1991

[86] PCT No.: PCT/GB91/01282
§ 371 Date: Jan. 15, 1993
§ 102(e) Date: Jan. 15, 1993

[87] PCT Pub. No.: WO92/02737
PCT Pub. Date: Feb. 20, 1992

[30] Foreign Application Priority Data

Jul. 28, 1990 [GB] United Kingdom ............ 9016625

[51] Int. Cl.[5] ............................................. H02K 7/09
[52] U.S. Cl. .................................................. 310/90.5
[58] Field of Search .................... 310/90.5, 268, 217, 310/218, 156, 42

[56] References Cited

U.S. PATENT DOCUMENTS

| | | | |
|---|---|---|---|
| 3,746,407 | 7/1973 | Stiles et al. | |
| 4,180,296 | 12/1979 | Habermann | |
| 4,332,428 | 6/1982 | Maruyama | 310/90.5 |
| 4,820,949 | 4/1989 | Mizobuchi et al. | 310/90 |
| 4,958,098 | 9/1990 | Sarraf | 310/90.5 X |
| 5,079,458 | 1/1992 | Schuster | 310/90.5 X |

FOREIGN PATENT DOCUMENTS 2574880 12/1986 France .

*Primary Examiner*—Steven L. Stephan
*Assistant Examiner*—E. To
*Attorney, Agent, or Firm*—Nixon & Vanderhye

[57] ABSTRACT

Laminated stator (15, 16) and rotor components (11) of a magnetic thrust bearing comprise a plurality of generally radially disposed laminations (2) fixed at their inner end to a cylindrical hub (3), the laminations all being curved in the same direction so that their outer tips lie in a common cylindrical plane (6) which is concentric with said hub (3).

5 Claims, 2 Drawing Sheets

ROTOR AND STATOR COMPONENTS FOR A MAGNETIC BEARING

This invention relates to magnetic bearings and is in particular concerned with thrust bearings for use in conjunction with rotating shafts.

It is well-known to support a rotatable shaft by means of a magnetic bearing. It is also known to control the axial displacement of such a shaft by means of a magnetic thrust bearing, as opposed to a conventional thrust race. A magnetic thrust bearing comprises a rotor mounted on the rotable shaft whose axial displacement is to be regulated and at least one fixed stator element mounted to associated hardware. The stator element has associated with it the energising windings whereby the position controlling force is generated, and regulated, typically under the control of electronic sensing-/positioning circuitry. It is usual to manufacture the rotor component from solid, iron-based alloys and the same material may be used for the stator(s). This is acceptable where the thrust load is fairly static and the rate of change of flux is not a significant factor.

However, where there are dynamic load changes accompanied by a high rate of change of flux, solid components are undesirable because of the eddy currents developed. These result in high power loss and very significant heating of the bearing components. Accordingly, a laminated construction is preferred for such applications, but if such a construction is to be effective, simple radially-directed laminations are unsatisfactory because of the reduction in magnetic surface area in the progressively radially outward direction. It will be noted that a typical lamination thickness is on the order of 0.1 to 0.25 mm. Wedge shape laminations are not a satisfactory solution, because of this fact. One proposed solution is to increase the diameter of the co-operating components, though this does not really address the further problem which arises when the respective rotor and stator laminations do not actually align with one another at their outer periphery. Where there is no alignment, there will be a high reluctance; where there is alignment, there will be a low reluctance. The overall effect is one of rapid changes leading to higher winding losses and to the generation of high frequency transients in the windings.

It is an object of this invention to minimise these problems.

According to this invention, the stator and rotor components of a magnetic thrust bearing are each of laminated construction, the laminations being curved so that their tips lie in a common cylindrical plane. The arrangement is preferably such that abutting side edges of the laminations also lie in common planes, which are disposed normal to the axis of rotation.

By curving the lamination tips (in effect) about the axis of rotation, the gap between adjacent laminations can be very considerably reduced, at the expense of overall outside diameter. If this is a problem, it can be compensated for by increasing the length of the laminations, of course, but in ordinary circumstances this will not be needed, since the arrangement of this invention results in considerably improved magnetic efficiency.

A further advantage of the invention lies in the fact that manufacture of a rotor and two stator components can be carried out from a single cylindrical assembly which is cut into three sections at right angles to its central axis.

One method of making a magnetic thrust bearing according to the invention comprises the steps of mounting a plurality of generally radially aligned laminations to a central supporting hub, bending said laminations about the axis of said hub until their distal edges lie in a common cylindrical plane, and clamping said distal edges in that plane. The method may include the step of cutting the clamped assembly into at least two portions, with the cut lying in a plane normal to said axis. Preferably, a single clamped assembly is cut into three such portions, to form the components of a complete magnetic thrust bearing. In the case of the two portions destined for use as stators, the method may also include the step of generating an axially extending annular recess in one face of each portion to receive an energising winding.

In order that the invention be better understood, an embodiment of it will now be described by way of example with reference to the accompanying drawings, in which.

Figure 1:
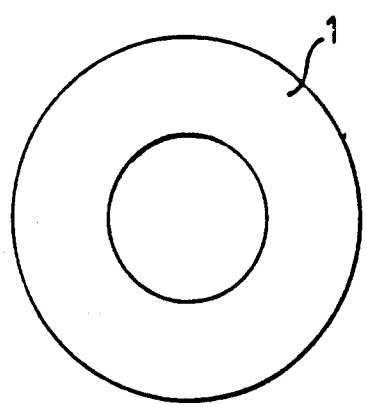
FIGS. 1, 2 and 3 are schematic side views of magnetic thrust bearing elements constructed in accordance with the prior art.
Figure 2:
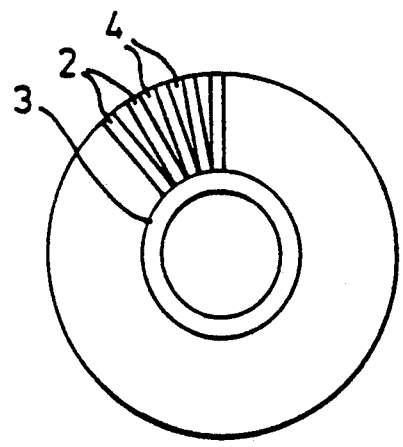
Figure 3:
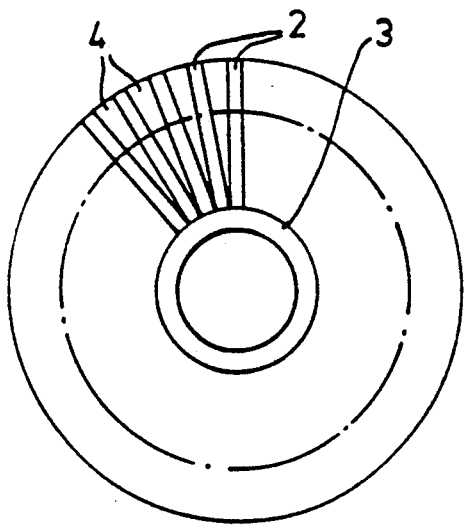

Referring firstly to FIGS. 1-3, a solid metal collar 1 is replaced in FIG. 2 by a plurality of radially directed laminations 2 supported by a central hub 3 and "potted" in a thermoset resin compound 4. The latter serves to fill the generally triangular (in section) voids between adjacent laminations as well as to stabilise the assembly. FIG. 3 shows the extend to which the outside diameter of the assembly of FIG. 2 must be increased, if the assembly is to have an equivalent magnetic area to that of the simple solid collar of FIG. 1.

Figure 4:
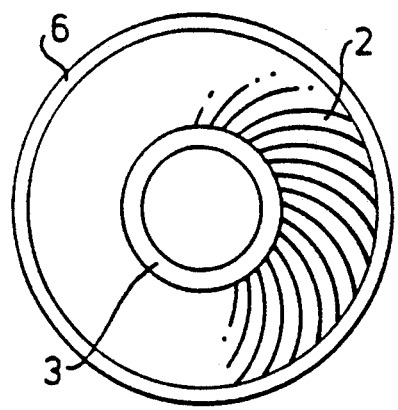
FIG. 4 illustrates the construction of a thrust bearing element according to the present invention.

FIG. 4 illustrates the invention. The radially directed laminations of FIGS. 2 and 3 have been curved about the axis of the central hub 3, to form a tightly packed assembly in which the distal edges of the laminations all lie in a cylindrical plane. They are retained in this attitude by a non-magnetic clamping band 6.

Figure 5:
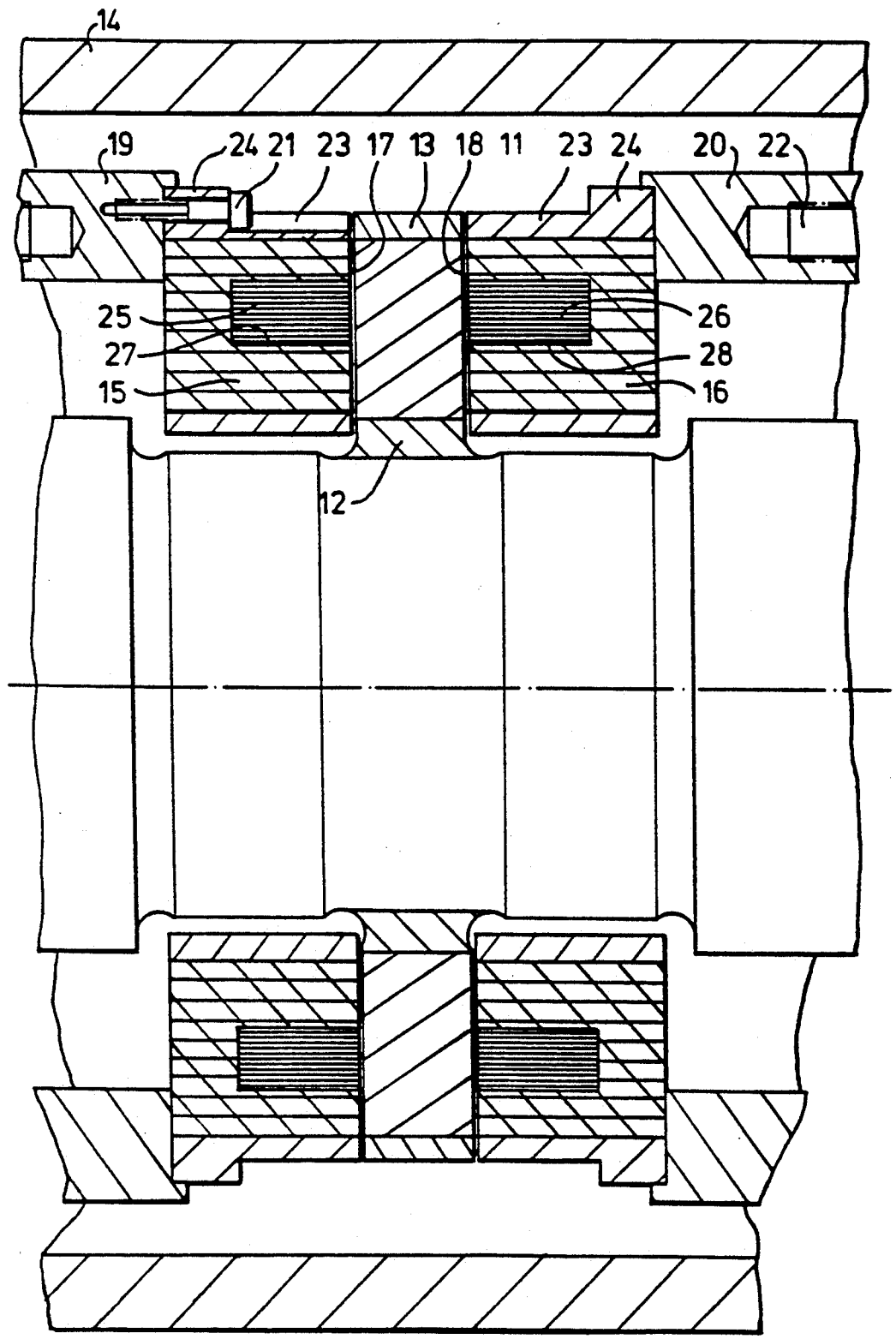
FIG. 5 is a schematic cross-sectional side view of a complete thrust bearing assembly embodying the bearing element of FIG. 4.

FIG. 5 illustrates a practical application of the embodiment of FIG. 4. In FIG. 5, a rotatable shaft 10 is supported in the radial direction at each end by magnetic bearings (not shown). In order to provide control of axial forces on the shaft 10 a magnetic thrust bearing is employed. This comprises a rotor element 11 rigidly attached to the shaft by means of a mounting hoop 12. The rotor element is of laminated construction, exactly as shown in FIG. 4 and has a stainless steel outer clamping band 13, which corresponds to the band 6 of that Figure. An outer casing 14 supports stator elements 15, 16 in close proximity to the opposed faces 17, 18 of the rotor element 11. The casing is provided with internal abutments 19, 20 for this purpose, setscrews 21, 22 being used to retain and precisely locate the stator elements. Referring to the latter, their construction is basically the same as that of the rotor element, and indeed, according to a preferred aspect of this invention, they are all manufactured together as a unitary block which is thereafter cut into three portions. It will be noted that for mounting purposes, the stator elements include an outer collar 23 provided with an external flange 24 to receive a plurality of circumferentially spaced setscrews 21. The stator elements are provided with annular energising windings, 25, 26 which are located in annular axially extending recesses 27, 28 respectively, machined into their faces.

Operation of the thrust bearing is itself convention, power being supplied to the windings 25, 26 via leads passing through axially extending drilled apertures (not shown) in the stator elements, the power applied being controlled in accordance with the sensed axial position of the rotor element relative to the stator elements. For this purpose, a conventional transducer system may be used. However this need not be further discussed here, since it is not material to the invention.

I claim:

1. Laminated stator and rotor components of a magnetic thrust bearing, each comprising a plurality of generally radially disposed and radially adjacent laminations, said rotor component laminations fixed at their inner ends to a cylindrical hub having an axis of rotation, the laminations all being curved in the same direction so that their outer tips lie in a common cylindrical plane which is concentric with said hub.

2. Components according to claim 1 wherein abutting side edges of the laminations also lie in common planes, which are disposed normal to said axis of rotation of the hub.

3. Components according to claim 1 wherein said outer tips are constrained by a non magnetic band.

4. Components according to claim 1 wherein there is substantially no gap between adjacent laminations.

5. Components according to claim 1 wherein a single stack of laminations is cut through at right angles to the axis of the hub, to produce a set of stator and rotor elements for a magnetic thrust bearing.

* * * * *